Feb. 17, 1925.

P. E. NORRIS

ELECTRIC BATTERY

Filed Jan. 10, 1923

1,526,865

INVENTOR:
Paul E. Norris,
BY
His ATTORNEY

Patented Feb. 17, 1925.

1,526,865

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

ELECTRIC BATTERY.

Application filed January 10, 1923. Serial No. 611,859.

*To all whom it may concern:*

Be it known that I, PAUL E. NORRIS, a citizen of the United States, residing at Wilkinsburg, in the county of Allegheny and State of Pennsylvania, have invented certain new and useful Improvements in Electric Batteries, of which the following is a specification.

My invention relates to electric batteries, and is particularly adapted for, though in no way limited to, batteries of the storage or secondary type.

I will describe one form of electric battery embodying my invention, and will then point out the novel features thereof in claims.

Figure 1:
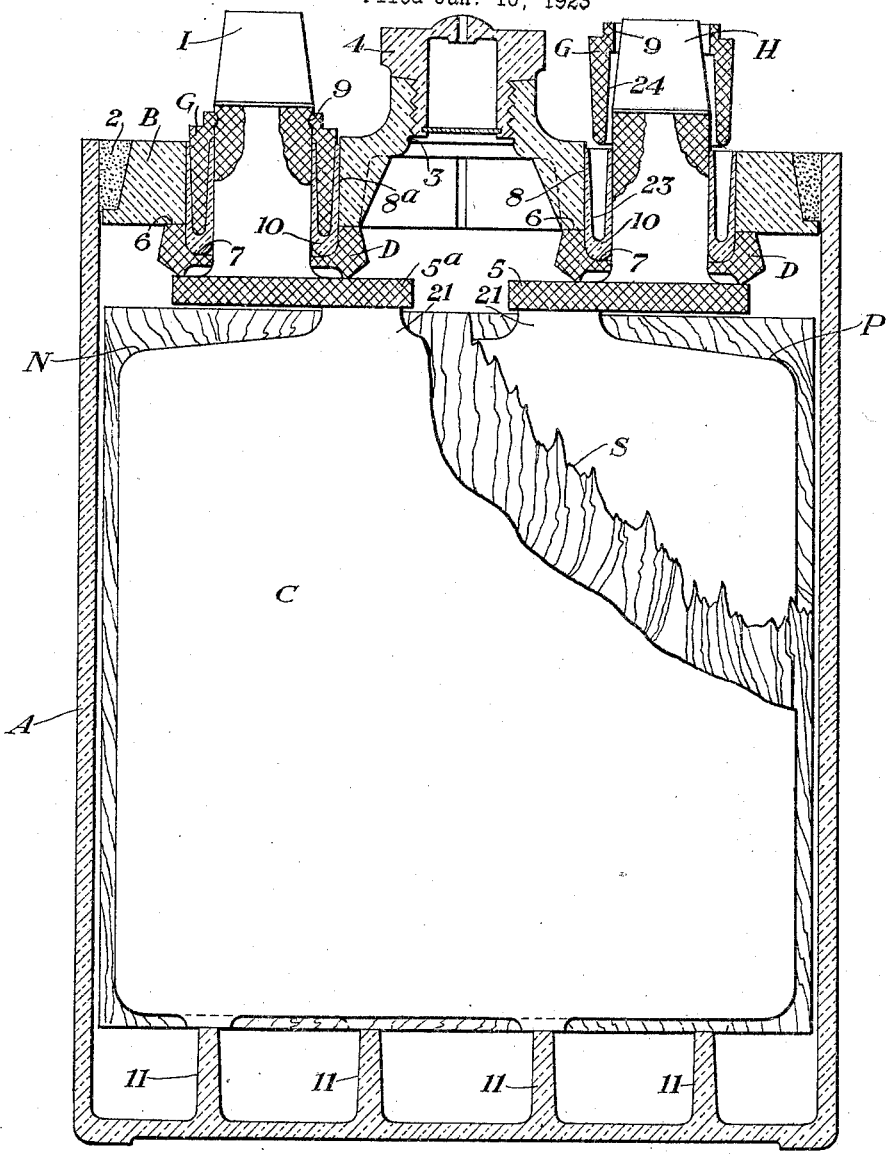
Figure 2:
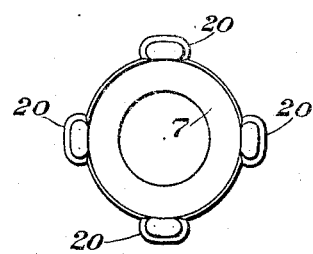
Figure 3:
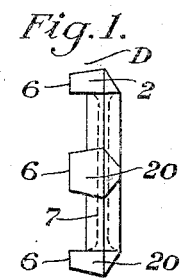

In the accompanying drawings, Fig. 1 is a view showing in vertical section one form of electric battery embodying my invention. Fig. 2 is a top view of one of the seating members of the battery shown in Fig. 1. Fig. 3 is a view showing in front elevation the seating member shown in Fig. 2.

Similar reference characters refer to similar parts in each of the views.

Referring first to Fig. 1 the battery comprises a container or jar A of some acid resisting material such as glass or hard rubber, and a cell cover B usually of hard rubber inserted in the top of the jar A and sealed therein by means of sealing compound 2. The cell cover is provided with two round spaced terminal post holes 8 and 8ª, and with a vent hole 3 closed by a threaded vent plug 4.

Located within the jar A is a battery element C comprising a group of alternately disposed negative and positive plates with a separator between each two adjacent plates. One positive plate is shown at P, one negative plate at N and the associated separator is illustrated at S. In accordance with common practice the plates and separators are partly supported by upstanding plate rests 11 which are located at the bottom of the jar A. All of the positive plates P are rigidly attached to a connecting strap 5, while all the negative plates N are rigidly attached to a similar strap 5ª, both straps 5 and 5ª being of electro-conductive material, such as antimony lead. Each of the plates is provided with an upstanding lug 21 for attachment to the associated strap in the usual manner. The positive connecting strap 5 is provided with a positive terminal post H which is usually integral with the strap and is always rigidly attached thereto, and which post extends upwardly through the hole 8 in the cell cover B. The negative connecting strap 5ª is provided with a similar negative terminal post I which extends upwardly through the hole 8ª in the cell cover B. It will be noticed that each terminal post is considerably smaller in diameter than the hole in the cell cover through which it passes, leaving an annular space between the hole and the post.

Each terminal post is provided with an annular seating member D, which is preferably of lead, although it could be made of some other suitable substance, such as hard rubber, bakelite, or any acid proof material. This member D rests upon a suitable shoulder associated with the post and which shoulder as here shown is the top surface of the associated connecting strap 5 or 5ª. This seating member is provided, as shown best in Figs. 2 and 3, with lugs 20 spaced around its periphery and upon whose upper surfaces 6 the cell cover is supported. As here shown, four such lugs are provided, but this particular number of lugs is not essential. The positive terminal post H is surrounded by a sleeve-like gasket 10 which rests in an annular recess 7 in the top of the associated seating member D. This gasket is of some resilient material such as soft rubber and is provided with an annular V-shaped recess 23 which starts at the top and extends well toward the bottom of the gasket. The post H is also provided with a gland G which is preferably of the same material as the post H and usually of lead, the lower end of which constitutes a circular wedge shaped projection 24 adapted to enter the recess 23 in the gasket 10. The top of this gland is provided with an annular collar 9 of reduced thickness, the purpose of which collar will be explained hereinafter.

Associated with negative terminal post I is a structure similar to that associated with post H. The gland G associated with the positive terminal post H is shown in elevated position on its post in order more clearly to illustrate the shapes of the various parts and the manner in which the structure is assembled.

Since the structures for both terminal posts are identical, I shall describe the assembly for the positive post H and the adjacent parts and it will be understood that the discussion is equally applicable to negative post I and its surrounding structure.

To assemble the battery the element C comprising the plates, separators, connecting straps and terminal posts is first fabricated in the usual manner and inserted as a whole in jar A where it is supported on the rests 11 as previously explained. The seating members D are then placed in position on the terminal posts I and H and the cell cover B is inserted in the jar and sealed. The gasket 10 is then placed in the position shown on post H and gland G is then driven downwardly on the post, thereby spreading the gasket 10 against the post and the wall of hole 8 with considerable force. To retain the gland in this position the collar 9 of gland G is then jammed into post H by a suitable tool, thereby fastening the two parts together and preventing the gland from rising on the post.

It will be observed that when the gland G is driven into place, the lower end of gasket 10 is pressed with some force against the seating member D. Inasmuch as this end of the gasket is well below the under surface of the cover B, this pressure is liable to cause the lower portion of gasket G to bulge out and thus make an imperfect seal between the terminal post and the cell cover. In my invention I prevent this occurrence by abutting the bottom of gasket 10 against the cup-shaped recess 7 in the top of seating member D. The result is that increased pressure on gasket 10 simply forces this gasket more tightly against the side of the terminal post. It is of course, plain that this vertical pressure is present only during assembly of the battery, and that after the parts are in place, the pressure on gasket 10 is almost entirely horizontal and tends to force this gasket against the terminal post and the associated terminal post hole 8.

Although I have herein shown and described only one form of electric battery embodying my invention, it is understood that various changes and modifications may be made therein within the scope of the appended claims without departing from the spirit and scope of my invention.

Having thus described my invention, what I claim is:

1. In an electric battery, a cell cover provided with a hole, a terminal post projecting through said hole, a seating member surrounding said post and provided with a cup-shaped upper surface, a gasket surrounding said post and resting on said seating member and having a recess in its upper end, and a gland sleeved on said post and having a circular projection on its lower end adapted to enter the recess in said gasket to spread the gasket against the post and the wall of said hole.

2. In an electric battery, a cell cover provided with a hole, a terminal post projecting through said hole, a seating member surrounding said post and supported by said post and having a cup-shaped upper surface, a gasket surrounding said post and resting on said cup-shaped surface, and means for spreading said gasket against the walls of said hole and said post.

3. In an electric battery, a cell cover provided with a hole, a terminal post projecting through said hole, and provided with a shoulder, a seating member surrounding said post and resting on said shoulder and having a cup-shaped upper surface, a gasket surrounding said post and resting on said cup-shaped surface and having a circular recess in its upper end, and a gland sleeved on said post and having a circular projection on its lower end adapted to enter the recess in said gasket.

4. An electric battery comprising a cell cover provided with a hole, a terminal post projecting through said hole, a circular wedge shaped gland located at least in part between said post and said cover, a seating member having a cup-shaped upper surface, and resilient sealing means between said cover and said gland and between said gland and said post and resting on said cup-shaped surface.

5. In an electric battery, a cell cover provided with a hole, a terminal post projecting through said hole, a metallic seating member surrounding said post and provided with a cup-shaped upper surface, a gasket surrounding said post and resting on said seating member and having a recess in its upper end, and a gland sleeved on said post and having a circular projection on its lower end adapted to enter the recess in said gasket to spread the gasket against the post and the wall of said hole.

6. In an electric battery, a cell cover provided with a hole, a terminal post projecting through said hole, an antimony lead seating member surrounding said post, and provided with a cup-shaped upper surface, a gasket surrounding said post and resting on said seating member and having a recess in its upper end, and a gland sleeved on said post and having a circular projection on its lower end adapted to enter the recess in said gasket to spread the gasket against the post and the wall of said hole.

7. In an electric battery, a cell cover provided with a hole, a terminal post projecting through said hole, a rigid seating member surrounding said post and provided with a cup-shaped upper surface, a gasket surrounding said post and resting on said seating member and having a recess in its upper end, and a gland sleeved on said post and having a circular projection on its lower end adapted to enter the recess in said gasket to spread the gasket against the post and the wall of said hole.

8. In an electric battery, a cell cover provided with a hole, a terminal post projecting through said hole, and a seating member resting on a shoulder associated with said post and provided with upstanding lugs for supporting said cell cover.

In testimony whereof I affix my signature.

PAUL E. NORRIS.